United States Patent
Chowdhury et al.

(10) Patent No.: US 10,200,144 B1
(45) Date of Patent: Feb. 5, 2019

(54) COMMUNICATION SYSTEM FOR CONNECTING NETWORK HOSTS

(71) Applicant: Alcatel-Lucent USA Inc., Murray Hill, NJ (US)

(72) Inventors: Aref Chowdhury, Berkeley Heights, NJ (US); David Miles, Murray Hill, NJ (US)

(73) Assignee: NOKIA OF AMERICA CORPORATION, Murray Hill, NJ (US)

( * ) Notice: Subject to any disclaimer, the term of this patent is extended or adjusted under 35 U.S.C. 154(b) by 0 days.

(21) Appl. No.: 15/705,450

(22) Filed: Sep. 15, 2017

(51) Int. Cl.
*H04J 14/02* (2006.01)
*H04B 10/50* (2013.01)
(Continued)

(52) U.S. Cl.
CPC ...... *H04J 14/0205* (2013.01); *G02B 6/29382* (2013.01); *H04B 10/501* (2013.01);
(Continued)

(58) Field of Classification Search
CPC .. H04J 14/0204; H04J 14/0205; H04J 14/021; H04J 14/022; H04J 14/02;
(Continued)

(56) References Cited

U.S. PATENT DOCUMENTS

| | | | |
|---|---|---|---|
| 7,050,667 B2 * | 5/2006 | Graves | H04J 14/02 385/16 |
| 7,155,127 B2 * | 12/2006 | Akimoto | H04B 10/40 398/72 |

(Continued)

OTHER PUBLICATIONS

Al-Fares, Mohammad, Alexander Loukissas, and Amin Vahdat. "A scalable, commodity data center network architecture." ACM SIGCOMM Computer Communication Review. vol. 38. No. 4. ACM, 2008.

(Continued)

*Primary Examiner* — Hibret Woldekidan
(74) *Attorney, Agent, or Firm* — Mendelsohn Dunleavy, P.C.; Yuri Gruzdkov

(57) ABSTRACT

A communication system that can be used, e.g., to provide high-speed access to the servers of a data center. In an example embodiment, the communication system transports data using WDM optical signals. The downlink WDM signals have some WDM components that are modulated with data and some WDM components that are not modulated with data. The uplink WDM signals are generated at the server end of the system by modulating with data the unmodulated WDM components received through the downlink. Appropriately connected wavelength multiplexers, wavelength demultiplexers, and/or optical filters can be used to properly apply the various modulated WDM components to the corresponding optical receivers and the unmodulated WDM components to the corresponding optical transmitters. The resulting system architecture advantageously enables, e.g., the use of a single, conveniently located multi-wavelength light source to provide carrier wavelengths for both uplink and downlink optical traffic.

25 Claims, 7 Drawing Sheets

(51) Int. Cl.
*G02B 6/293* (2006.01)
*G02B 6/12* (2006.01)

(52) U.S. Cl.
CPC .......... *H04J 14/021* (2013.01); *H04J 14/022* (2013.01); *G02B 6/12009* (2013.01); *G02B 6/29338* (2013.01)

(58) Field of Classification Search
CPC ............... H04J 14/0212; H04J 14/0209; H04J 14/0201; H04J 14/0219; H04J 14/0298; H04J 14/0241; H04J 14/025; H04J 14/0217; H04J 14/0234; H04J 14/0245; H04J 14/0282; H04B 10/501; H04B 10/25073; H04B 10/506; H04B 10/40; H04Q 2011/0016; G02B 6/12009; G02B 6/29; G02B 6/29382
USPC ........ 398/79, 82, 83, 84, 85, 45, 48, 50, 68, 398/135, 183
See application file for complete search history.

(56) References Cited

U.S. PATENT DOCUMENTS

| 7,450,000 | B2* | 11/2008 | Gidge | H04B 3/58 340/3.1 |
|---|---|---|---|---|
| 7,555,215 | B2* | 6/2009 | Nakamura | H04J 14/0226 398/20 |
| 7,676,156 | B2 | 3/2010 | Wellen | |
| 8,538,259 | B2* | 9/2013 | Kai | H04J 14/0226 398/48 |
| 8,548,334 | B2* | 10/2013 | Mazed | H04B 10/272 398/140 |
| 8,965,203 | B1 | 2/2015 | Vahdat et al. | |
| 9,140,624 | B2* | 9/2015 | Bao | G01N 21/55 |
| 9,705,630 | B2* | 7/2017 | Liboiron-Ladouceur | H04J 14/04 |
| 9,723,388 | B2* | 8/2017 | Mazed | H04B 10/272 |
| 2002/0025109 | A1* | 2/2002 | Shirasaki | G02B 6/293 385/24 |
| 2002/0030869 | A1* | 3/2002 | Okazaki | H04J 14/0204 398/87 |
| 2003/0048507 | A1* | 3/2003 | Shimomura | H04J 14/0204 398/48 |
| 2004/0081421 | A1* | 4/2004 | Mori | H04B 10/506 385/140 |
| 2005/0025486 | A1 | 2/2005 | Zhong et al. | |
| 2006/0097573 | A1* | 5/2006 | Gidge | H04B 3/58 307/3 |
| 2007/0076505 | A1* | 4/2007 | Radtke | H04B 3/58 365/222 |
| 2007/0248361 | A1* | 10/2007 | Nakamura | H04B 10/2569 398/152 |
| 2008/0304830 | A1 | 12/2008 | Huang et al. | |
| 2009/0274462 | A1* | 11/2009 | Yu | H04B 10/2587 398/68 |
| 2012/0213519 | A1* | 8/2012 | Lee | H04B 10/506 398/72 |
| 2013/0209105 | A1* | 8/2013 | Jeong | H04J 14/0282 398/72 |
| 2015/0189408 | A1* | 7/2015 | Chen | H04Q 11/0005 398/49 |
| 2015/0372781 | A1* | 12/2015 | Frankel | H04J 14/06 398/47 |
| 2016/0105736 | A1* | 4/2016 | Dai | H04Q 11/0005 398/49 |
| 2016/0134375 | A1 | 5/2016 | Kakande | |
| 2017/0187483 | A1* | 6/2017 | Mansouri Rad | H04J 14/0206 |

OTHER PUBLICATIONS

"Series G: Transmission systems and media digital systems and networks." ITU-T G.694-1, Feb. 2012, 16 pages.
International Search Report and Written Opinion; dated Dec. 10, 2018 for PCT Application No. PCT/IB2018/057268.

* cited by examiner

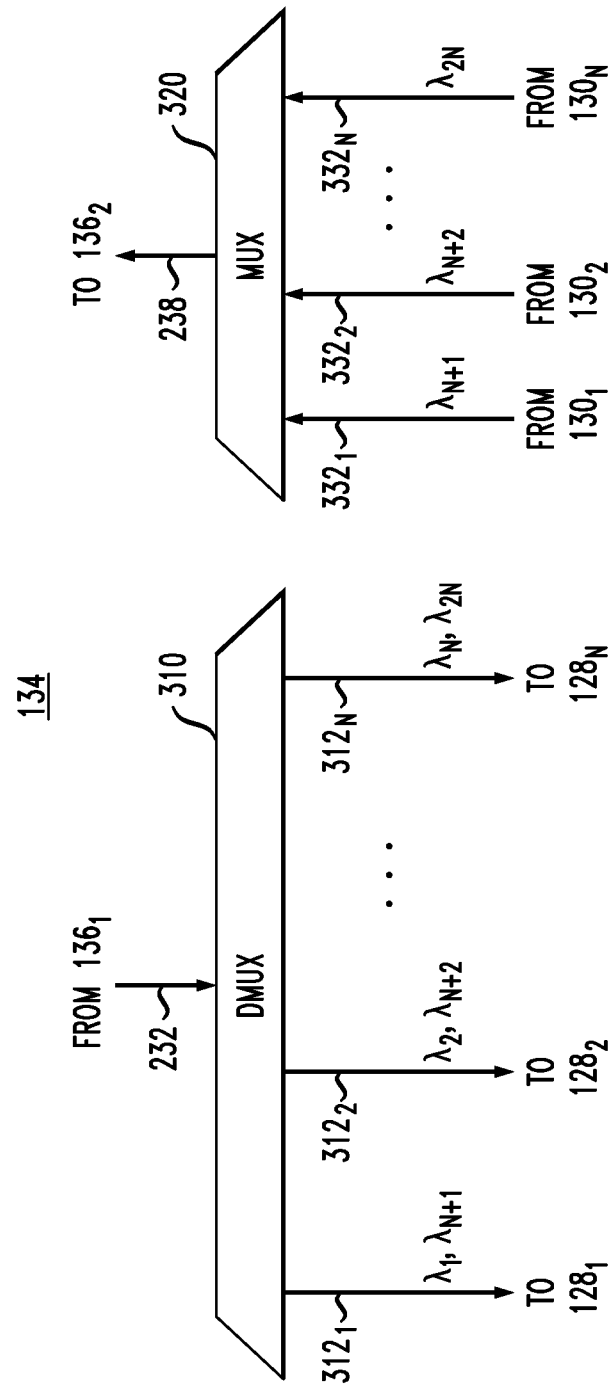

440n

440n

440n

500

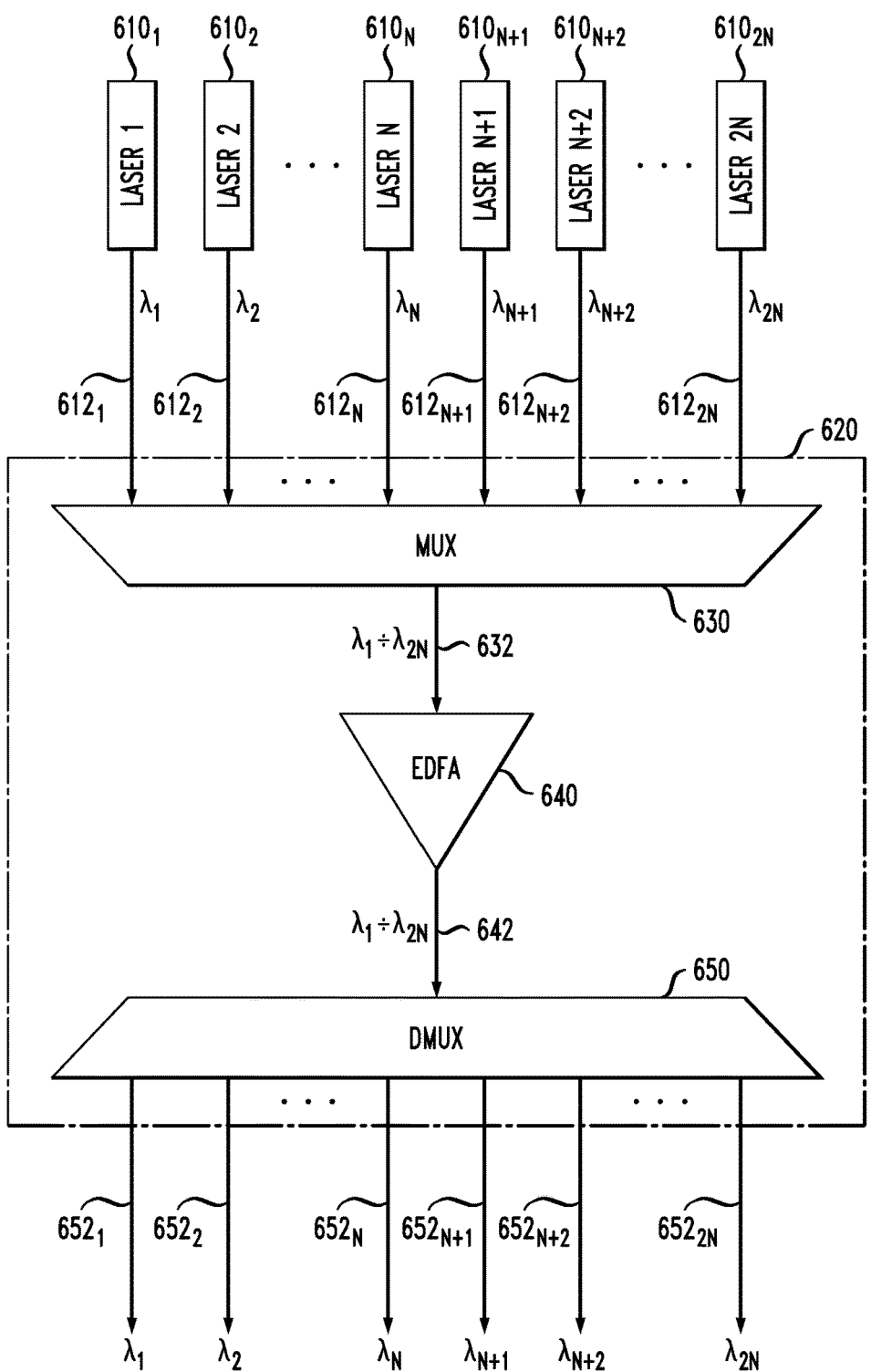

COMMUNICATION SYSTEM FOR CONNECTING NETWORK HOSTS

BACKGROUND

Field

The present disclosure relates to optical communication equipment and, more specifically but not exclusively, to a communication system for connecting network hosts.

Description of the Related Art

This section introduces aspects that may help facilitate a better understanding of the disclosure. Accordingly, the statements of this section are to be read in this light and are not to be understood as admissions about what is in the prior art or what is not in the prior art.

The rapid growth of data-center traffic is well documented. For example, a data center configured to serve cloud-type applications may soon be required to support and/or handle traffic loads on the order of 1 to 10 Pbit/second. It is believed that the use of optical transport technologies in such data centers may be needed to provide this kind of technical capabilities.

SUMMARY OF SOME SPECIFIC EMBODIMENTS

Disclosed herein are various embodiments of a communication system that can be used, e.g., to provide high-speed access to the servers of a data center. In an example embodiment, the communication system transports data using wavelength-division-multiplexed (WDM) optical signals. The downlink WDM signals have some WDM components that are modulated with data and some WDM components that are not modulated with data. The uplink WDM signals are generated at the server end of the system by modulating with data the unmodulated WDM components received through the downlink. Appropriately connected wavelength multiplexers, wavelength demultiplexers, and/or optical filters can be used to properly apply the various modulated WDM components to the corresponding optical receivers and the unmodulated WDM components to the corresponding optical transmitters. The resulting system architecture advantageously enables, e.g., the use of a single, conveniently located multi-wavelength light source to provide carrier wavelengths for both uplink and downlink optical traffic.

According to an example embodiment, provided is an apparatus comprising: a first wavelength demultiplexer having an optical input and a plurality of optical outputs; a first wavelength multiplexer having an optical output and a plurality of optical inputs; a plurality of optical drop filters, each having a respective optical input, a respective first optical output, and a respective second optical output; and a plurality of first optical modulators optically connected between the plurality of optical drop filters and the first wavelength multiplexer; wherein the respective optical input of each of the plurality of optical drop filters is optically connected to a respective one of the plurality of optical outputs of the first wavelength demultiplexer; and wherein the respective second optical output of each of the plurality of optical drop filters is optically connected to a respective one of the plurality of optical inputs of the first wavelength multiplexer by way of a respective one of the plurality of first optical modulators.

According to another example embodiment, provided is an apparatus comprising: a plurality of digital data servers; a first wavelength demultiplexer having optical outputs to the digital data servers; a first wavelength multiplexer having optical inputs from the digital data servers; an optical switch including a plurality of optical transceivers, a plurality of optical sources, a second wavelength multiplexer, and a second wavelength demultiplexer; wherein an optical output of the second wavelength multiplexer is fiber-connected to an optical input of the first wavelength demultiplexer; wherein an optical input of the second wavelength demultiplexer is fiber-connected to an optical output of the first wavelength multiplexer; wherein each optical transceiver is configured to transmit to a respective optical input of the first wavelength multiplexer a modulated optical carrier on a corresponding optical transmission wavelength channel and to receive from a respective optical output of the first wavelength demultiplexer a modulated optical carrier on a different optical reception wavelength channel; wherein each optical source is configured to transmit continuous wave light of a respective one of the wavelength reception channels to a respective optical input of the second optical wavelength multiplexer; and wherein each optical transceiver is configured to receive from the first wavelength demultiplexer continuous wave light of a respective one of the optical reception wavelength channels.

BRIEF DESCRIPTION OF THE DRAWINGS

Other aspects, features, and benefits of various disclosed embodiments will become more fully apparent, by way of example, from the following detailed description and the accompanying drawings, in which:

FIG. 3 shows a block diagram of an optical interface that can be used in the communication system of FIG. 1 according to an embodiment;

FIG. 6 shows a block diagram of a light source that can be used to supply carrier wavelengths to the interfaces shown in FIGS. 2-3 according to an embodiment.

DETAILED DESCRIPTION

Figure 1:
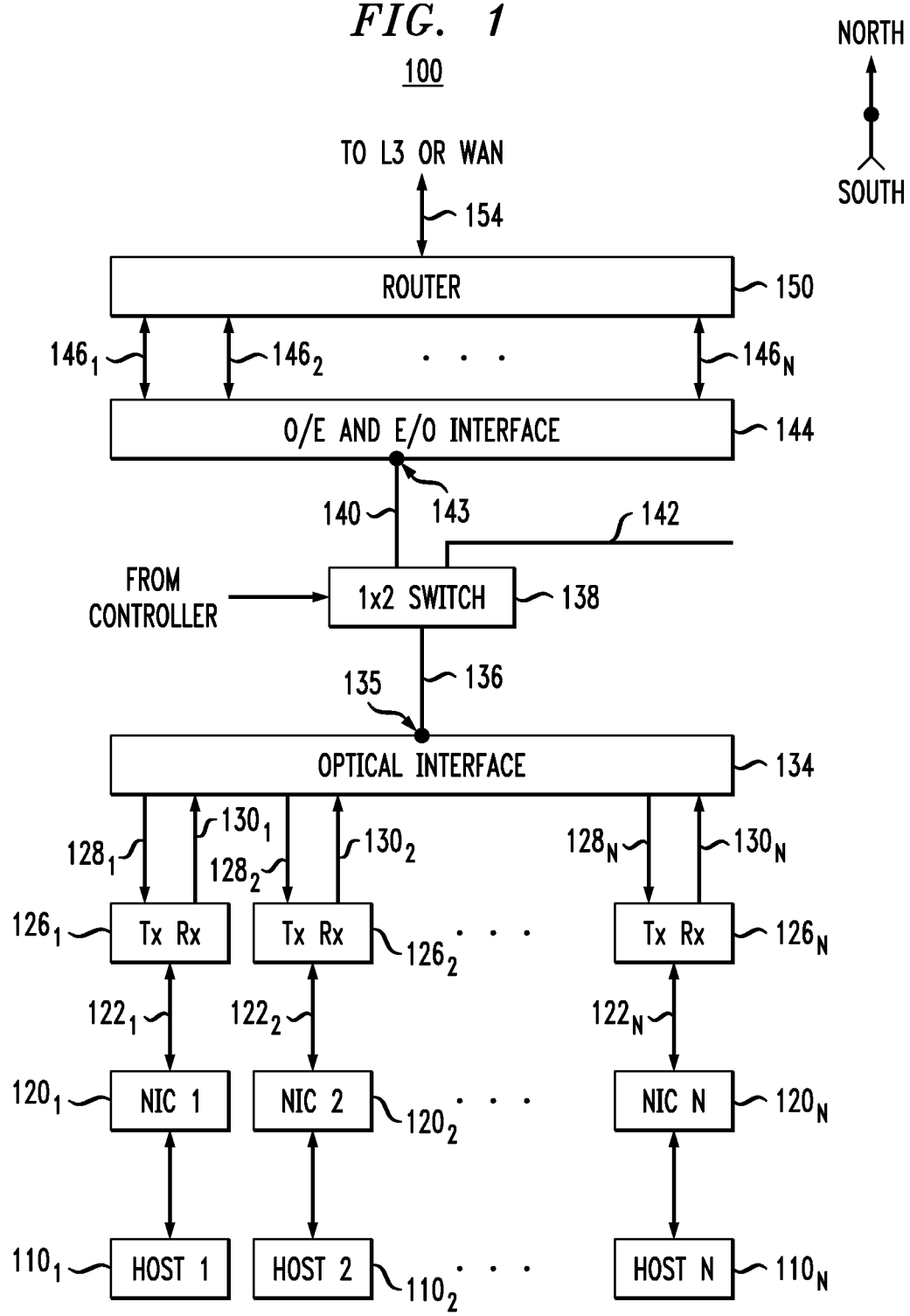
FIG. 1 shows a block diagram of a communication system according to an embodiment.

FIG. 1 shows a block diagram of a communication system 100 according to an embodiment. Some embodiments of system 100 can be used, e.g., in a Layer 2 (L2) network of a data center. As used herein, the term "data center" refers to a pool of resources (e.g., computational, storage, communication) interconnected using a communication network. Some of communication-network architectures and the corresponding layered topologies suitable for implementing a data center are reviewed, e.g., in Mohammad Al-Fares, et al., "A Scalable, Commodity Data Center Network Architecture," SIGCOMM'08, pp. 63-74, Aug. 17-22, 2008, Seattle, Wash., USA, which is incorporated herein by reference in its entirety.

In some embodiments, system 100 can be configured to transport data based on Ethernet technologies. In such embodiments, the data forwarding decisions are made, e.g., based on the Ethernet header of a data packet and its corresponding entry in the forwarding table.

In an example embodiment, system 100 comprises a router 150 and a plurality of network hosts (e.g., servers) $110_1$-$110_N$ operatively connected as described in more detail below. Router 150 is configured to (i) serve as a gateway to system 100 by connecting the latter to a Level 3 (L3) network, a wide area network (WAN), and/or the Internet and (ii) route data packets to, from, and between network hosts 110. Although FIG. 1 illustrates an embodiment in which, N≥3, in various alternative embodiments of system 100, N can be any (e.g., technically feasible) positive integer greater than one.

Herein, a signal traveling toward network hosts 110 may sometimes be referred to as a "downlink" signal. A signal traveling toward router 150 may sometimes be referred to as an "uplink" signal. For clarity, the following description also refers to the relative locations of some elements of system 100 using the terms "north" and "south," and to the relative signal-propagation directions using the terms "northward" and "southward." The use of these terms in the description of system 100 is strictly for pedagogical purposes and should not be construed to limit the topology and/or layout of this system to any or the corresponding north-south geographic orientation.

Each network host 110 may have a respective network interface card (NIC) 120. Each of NICs $120_1$-$120_N$ may have an associated unique MAC (Medium Access Control) or IP (Internet Protocol) address that enables router 150 to appropriately route data packets originating from and/or directed to any of network hosts $110_1$-$110_N$.

Router 150 and NICs $120_1$-$120_N$ are interconnected using optical transceivers $126_1$-$126_N$, an optical interface 134, a fiber-optic cable 136, an optional 1×2 optical switch 138, a fiber-optic cable 140, and an electro-optical interface 144. If present, switch 138 can be used to provide optical-path redundancy that enables the data traffic to bypass fiber-optic cable 140, electro-optical interface 144, and router 150 by way of a fiber-optic cable 142 connected to the switch, e.g., as explained in more detail below in reference to FIG. 5. In an example embodiment, each of fiber-optic cables 136, 140, and 142 may include a respective pair of optical fibers, with the two fibers of the pair being configured to carry optical signals propagating in respective opposite directions. In an embodiment in which switch 138 is absent, fiber-optic cables 136 and 140 are directly end-connected to one another at the putative location of the switch.

Optical transceivers $126_1$-$126_N$ are connected to NICs $120_1$-$120_N$ using ports $122_1$-$122_N$, respectively. Example embodiments of an optical transceiver $126_n$ (where n=1, 2, . . . , N) are described in more detail below in reference to FIGS. 4A-4D.

In an example embodiment, optical interface 134 is a passive optical device that connects optical transceivers $126_1$-$126_N$ to fiber-optic cable 136 by way of optical fibers $128_1$-$128_N$ and $130_1$-$130_N$ connected to the corresponding south ports of the optical interface. Optical fibers $128_1$-$128_N$ are configured to direct downlink optical signals from optical interface 134 to optical transceivers $126_1$-$126_N$, respectively. Optical fibers $130_1$-$130_N$ are configured to direct uplink optical signals from optical transceivers $126_1$-$126_N$, respectively, to optical interface 134. Optical interface 134 also has a north port 135 optically connected to fiber-optic cable 136. An embodiment of optical interface 134 is described in more detail below in reference to FIG. 3

Electro-optical interface 144 has (i) a south port 143 optically connected to fiber-optic cable 140 and (ii) N north ports $146_1$-$146_N$ electrically connected to the corresponding ports of router 150, e.g., as indicated in FIG. 1. South port 143 is configured to (i) receive, through fiber-optic cable 140, the optical signals carrying data transmitted southward and (ii) apply to fiber-optic cable 140 the optical signals carrying data transmitted northward. North ports $146_1$-$146_N$ are configured to (i) receive from router 150 the electrical signals carrying data transmitted southward and (ii) apply to router 150 the electrical signals carrying data transmitted northward. Electro-optical interface 144 includes circuits and/or devices (not explicitly shown in FIG. 1) configured to perform (i) electrical-to-optical (E/O) conversion of the southward-propagating signals and (ii) optical-to-electrical (O/E) conversion of the northward-propagating signals. An example embodiment of electro-optical interface 144 is described in more detail below in reference to FIG. 2.

Router 150 is capable of routing data packets between ports $146_1$-$146_N$ and between any of the ports $146_1$-$146_N$ and an "L3" port 154. For example, router 150 can be designed to electrically route data packets (i) between any port $146_i$ and any port $146_j$, where i≠j, and (ii) between any port $146_i$ and port 154, where i=1, 2, . . . , N and j=1, 2, . . . , N.

In some embodiments, router 150 can be a conventional router. In some other embodiments, router 150 can be replaced by a device comprising a suitable switch fabric capable of performing the functions of a router that are pertinent to the intended purpose and/or functionality of system 100. As such, the term "router" used in the claims should be construed to also cover the switch-fabric-based embodiments thereof.

In some embodiments, any number (e.g., some or all) of the device pairs connected to ports 122, each of such device pairs consisting of a respective network host 110 and a respective NIC 120, can each be replaced by any other (e.g., L2) data source, such as an Ethernet switch port. The latter configuration can be realized, e.g., when the corresponding network hosts are configured to communicate, via their respective NICs, to a top-of-rack Ethernet switch. The Ethernet switch can then be connected to a corresponding port 122 to connect the corresponding network hosts to system 100.

Figure 2:
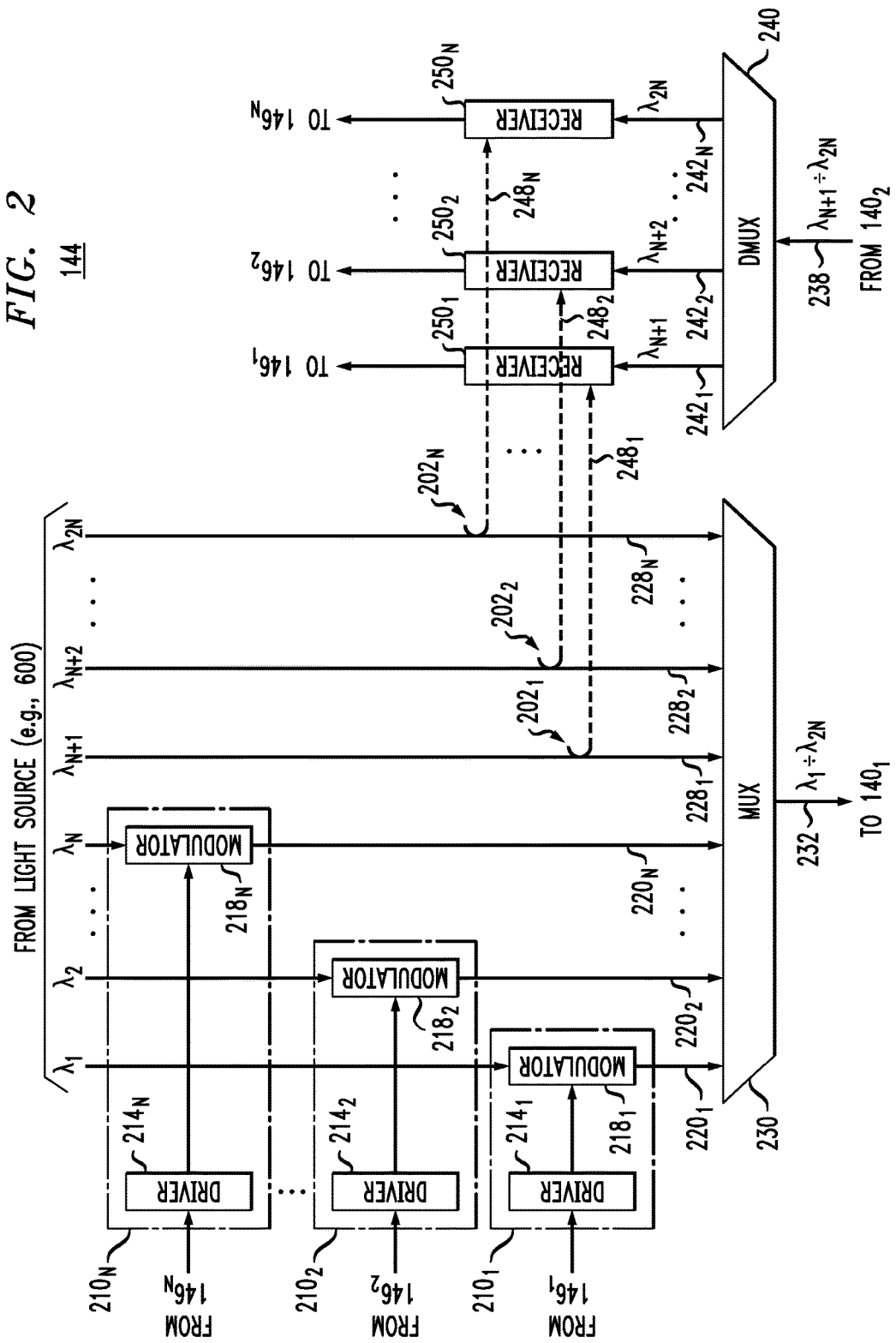
FIG. 2 shows a block diagram of an electro-optical interface that can be used in the communication system of FIG. 1 according to an embodiment.

FIG. 2 shows a block diagram of electro-optical interface 144 (FIG. 1) according to an embodiment. As shown in FIG. 2, electro-optical interface 144 comprises a plurality of optical transceivers 210/250 electrically connected to ports $146_1$-$146_N$ and optically connected to fiber-optic cable 140. Each of optical transceivers 210/250 comprises a respective one of optical transmitters $210_1$-$210_N$ and a respective one of optical receivers $250_1$-$250_N$. In the shown embodiment, fiber-optic cable 140 comprises optical fibers $140_1$ and $140_2$, with optical fiber $140_1$ being configured to transmit southward-propagating optical signals, and optical fiber $140_2$ being configured to transmit northward-propagating optical signals (also see FIG. 1).

Each of optical transmitters $210_1$-$210_N$ is configured to: (i) receive a respective one of carrier wavelengths $\lambda_1$-$\lambda_N$; (ii) modulate the received carrier wavelength with data received by way of a respective one of ports $146_1$-$146_N$; and (iii) apply the resulting modulated optical signal 220 to an optical wavelength multiplexer (MUX) 230. For example, optical transmitter $210_n$ (where n=1, 2, . . . , N) is configured to generate a modulated optical signal $220_n$ using an optical modulator $218_n$ and a driver circuit $214_n$ connected as indicated in FIG. 2. In various alternative embodiments, other suitable transmitter structures and/or architectures known in the pertinent art may also be used to implement optical transmitters $210_1$-$210_N$.

Optical wavelength multiplexer 230 is configured to receive optical signals $220_1$-$220_N$ and $228_1$-$228_N$. As indicated above, optical signals $220_1$-$220_N$ have carrier wavelengths $\lambda_1$-$\lambda_N$, respectively, and are modulated with data. In contrast, optical signals $228_1$-$228_N$ have carrier wavelengths $\lambda_{N+1}$-$\lambda_{2N}$, respectively, and are not modulated with data.

Carrier wavelengths $\lambda_1$-$\lambda_{2N}$ used in electro-optical interface 144 can be generated using any suitable external or internal light source, e.g., comprising a corresponding plurality of lasers or a wavelength-comb generator. In some embodiments, each of carrier wavelengths $\lambda_1$-$\lambda_{2N}$ can be generated using a respective CW laser. In some other embodiments, carrier wavelengths $\lambda_1$-$\lambda_{2N}$ can be generated using a suitable pulsed light source. An example external light source 600 that can be used to supply carrier wavelengths $\lambda_1$-$\lambda_{2N}$ to electro-optical interface 144 is described in more detail below in reference to FIG. 6.

In some embodiments, wavelengths $\lambda_1$-$\lambda_{2N}$ can be spectrally arranged in accordance with a frequency grid, e.g., compliant with the ITU-T G.694.1 Recommendation, which is incorporated herein by reference in its entirety.

Optical wavelength multiplexer 230 is further configured to (i) generate a WDM signal 232 by optically multiplexing optical signals $220_1$-$220_N$ and $228_1$-$228_N$ and (ii) apply WDM signal 232 to optical fiber $140_1$ as indicated in FIG. 2. As a result, WDM signal 232 has some WDM components that are modulated with data and some WDM components that are not modulated with data. In an example embodiment, optical wavelength multiplexer 230 can be implemented as known in the pertinent art, e.g., using an arrayed waveguide grating (AWG) or a wavelength-selective switch (WSS).

Depending on the embodiment, the sequence of wavelengths $\lambda_1, \lambda_2, \ldots, \lambda_{2N}$ may or may not be monotonic. In general, the wavelength set $\{\lambda_1, \lambda_2, \ldots, \lambda_{2N}\}$ may consist of 2N different wavelengths arranged in any order such that the subscript value used to label the wavelength in the set may or may not be indicative of the relative spectral position of that wavelength. For example, in some embodiments, the wavelength value $\lambda_2$ may be smaller than the wavelength value $\lambda_1$ and greater than the wavelength value $\lambda_{2N}$. The wavelength value $\lambda_{N+1}$ may be smaller than the wavelength value $\lambda_N$ and greater than the wavelength value $\lambda_{N+2}$, etc.

In some embodiments, the sequence of wavelengths $\lambda_1, \lambda_2, \ldots, \lambda_{2N}$ may be monotonic. For example, in one embodiment, the wavelengths $\lambda_1$-$\lambda_{2N}$ may be selected such that $\lambda_1 > \lambda_2 > \ldots > \lambda_N > \lambda_{N+1} > \ldots > \lambda_{2N-1} > \lambda_{2N}$. In another embodiment, the wavelengths $\lambda_1$-$\lambda_{2N}$ may be selected such that $\lambda_1 < \lambda_2 < \ldots < \lambda_N < \lambda_{N+1} < \ldots < \lambda_{2N-1} < \lambda_{2N}$.

Optical receivers $250_1$-$250_N$ are connected to an optical wavelength demultiplexer (DMUX) 240 as indicated in FIG. 2. Optical wavelength demultiplexer 240 is connected to optical fiber $140_2$ to receive therefrom a WDM signal 238 having carrier wavelengths $\lambda_{N+1}$-$\lambda_{2N}$. In an example embodiment, optical interface 134 operates to apply WDM signal 238 to optical wavelength demultiplexer 240 by way of fiber-optic cables 136 and 140 (also see FIGS. 1 and 3). Optical wavelength demultiplexer 240 operates to (i) separate WDM signal 238 into modulated optical signals (WDM components) $242_1$-$242_N$ having carrier wavelengths $\lambda_{N+1}$-$\lambda_{2N}$, respectively, and (ii) apply each of the modulated optical signals $242_1$-$242_N$ to a respective one of optical receivers $250_1$-$250_N$. Each of optical receivers $250_1$-$250_N$ then operates to (i) recover the data encoded in the respective one of the modulated optical signals $242_1$-$242_N$ and (ii) direct the recovered data to the respective one of ports $146_1$-$146_N$.

In some embodiments, optical receiver $250_n$ may be configured, as known in the pertinent art, for direct detection of modulated optical signal $242_n$, e.g., using a photodetector configured to convert that optical signal into a corresponding electrical signal proportional to the optical power (e.g., squared electric field) thereof. In some other embodiments, optical receiver $250_n$ may be configured, as known in the pertinent art, for coherent detection of modulated optical signal $242_n$, e.g., using a respective optical local oscillator signal $248_n$. In some of the latter embodiments, a plurality of optical taps $202_1$-$202_N$ may be used to provide optical local oscillator signals $248_1$-$248_N$ to optical receivers $250_1$-$250_N$, respectively, by diverting some of the optical power of optical signals $228_1$-$228_N$, e.g., as indicated in FIG. 2.

In an example embodiment, optical wavelength demultiplexer 240 can be implemented similar to optical wavelength multiplexer 230, e.g., using an AWG or a WSS. However, optical wavelength demultiplexer 240 can generally be smaller in size than optical wavelength multiplexer 230. For example, as indicated in FIG. 2, optical wavelength demultiplexer 240 has (N+1) optical ports, whereas optical wavelength multiplexer 230 has (2N+1) optical ports.

FIG. 3 shows a block diagram of optical interface 134 (FIG. 1) according to an embodiment. As shown, optical interface 134 comprises an optical wavelength demultiplexer (DMUX) 310 and an optical wavelength multiplexer (MUX) 320. In the shown embodiment, fiber-optic cable 136 comprises optical fibers $136_1$ and $136_2$, with optical fiber $136_1$ being configured to apply WDM signal 232 to optical wavelength demultiplexer 310, and optical fiber $136_2$ being configured to transmit out the WDM signal 238 applied thereto by optical wavelength multiplexer 320 (also see FIGS. 1 and 2).

Optical wavelength demultiplexer 310 operates to (i) separate WDM signal 232 into optical signals $312_1$-$312_N$ and (ii) apply optical signals $312_1$-$312_N$ to optical fibers $128_1$-$128_N$, respectively (also see FIG. 1). Each of optical signals $312_1$-$312_N$ is a WDM signal having two respective WDM components. More specifically, optical signal $312_n$ has (i) a first WDM component $312_{n,1}$ having carrier wavelength $\lambda_n$ and (ii) a second WDM component $312_{n,2}$ having carrier wavelength $\lambda_{N+n}$ (also see FIG. 4A).

WDM component $312_{n,1}$ of optical signal $312_n$ can substantially be a copy of modulated optical signal $220_n$ (see FIG. 2). As used herein, the term "substantially" indicates that (i) WDM component $312_{n,1}$ and modulated optical signal $220_n$ carry the same data and (ii) any differences between the optical waveforms of WDM component $312_{n,1}$ and modulated optical signal $220_n$ are caused by the optical losses and/or signal distortions imposed by the various optical elements of system 100 located in the optical path between optical transmitter $210_n$ (see FIG. 2) and optical transceiver $126_n$ (FIG. 1). As indicated above, those optical elements include at least optical wavelength multiplexer 230 (FIG. 2), fiber-optic cable 140 (FIG. 1), fiber-optic cable 136 (FIG. 1), and optical wavelength demultiplexer 310.

WDM component $312_{n,2}$ of optical signal $312_n$ is typically an attenuated copy of optical signal $228_n$ (see FIG. 2). As such, WDM component $312_{n,2}$ is not modulated with data.

In an example embodiment, optical wavelength demultiplexer 310 can be implemented as known in the pertinent art, e.g., using an AWG or a WSS.

Optical wavelength multiplexer 320 is configured to: (i) receive modulated optical signals $332_1$-$332_N$ from optical transceivers $126_1$-$126_N$, respectively; (ii) generate WDM signal 238 by optically multiplexing modulated optical signals $332_1$-$332_N$; and (ii) apply WDM signal 238 to optical fiber $136_2$ as indicated in FIG. 3. In an example embodiment, optical wavelength multiplexer 320 can be implemented as known in the pertinent art, e.g., using an AWG or a WSS.

Figure 4A:
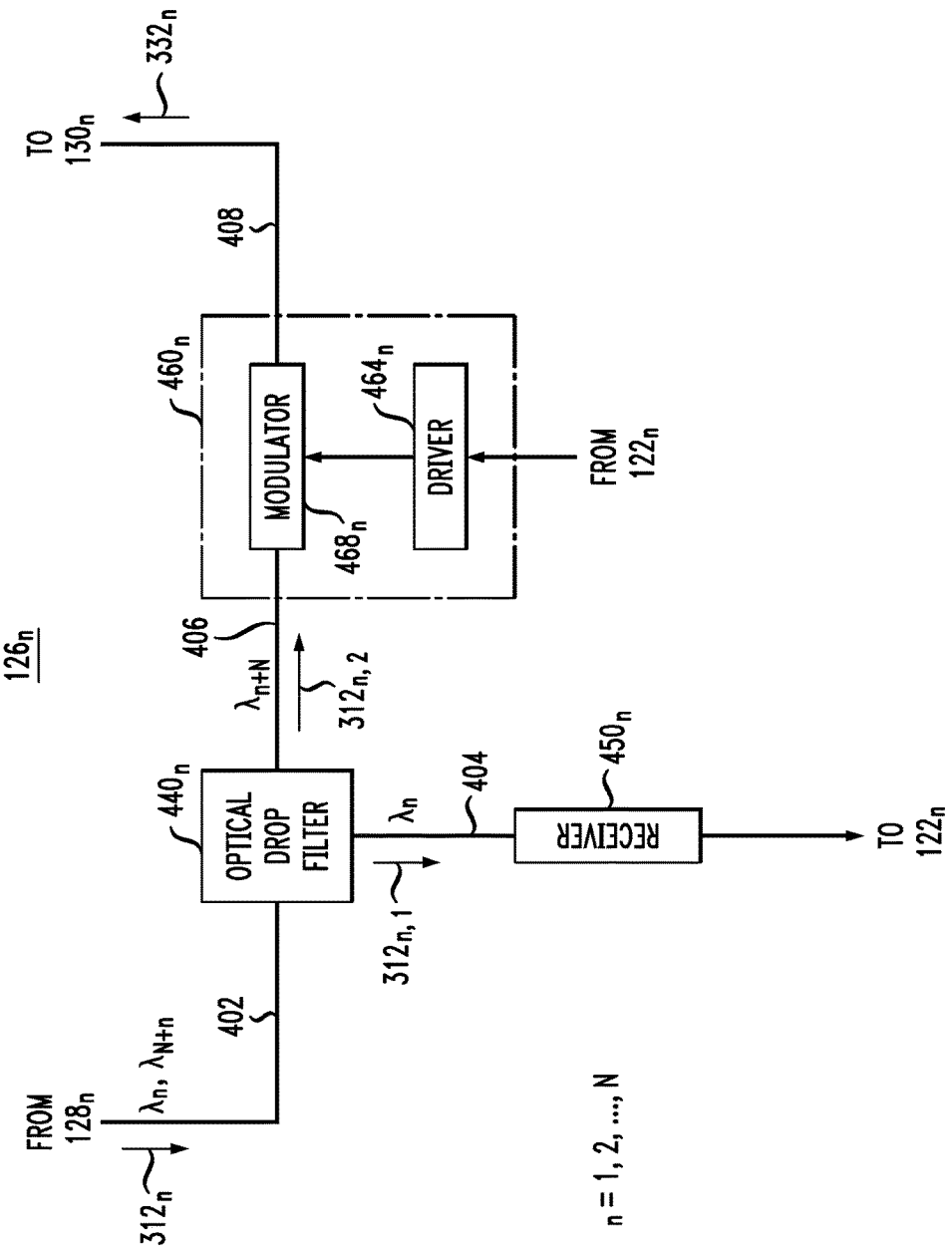
FIGS. 4A-4D show block diagrams of an optical transceiver that can be used in the communication system of FIG. 1 according to an embodiment.
Figure 4B:
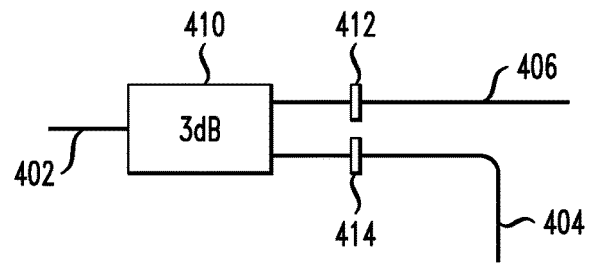
Figure 4C:
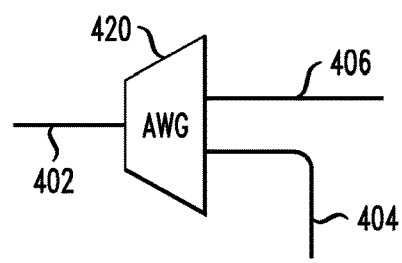

FIGS. 4A-4D show block diagrams of optical transceiver $126_n$ according to an embodiment. More specifically, FIG. 4A shows an overall block diagram of optical transceiver $126_n$. FIGS. 4B-4C show several possible embodiments of an optical drop filter $440_n$ that can be used in the embodiment of optical transceiver $126_n$ shown in FIG. 4A.

For illustration purposes and without any implied limitations, embodiments of optical transceiver $126_n$ are described in reference to a waveguide circuit. Based on the provided description, a person of ordinary skill in the art will understand how to make and use alternative embodiments of optical transceiver $126_n$ using suitable hybrid circuits and/or free-space optics.

Referring to FIG. 4A, optical transceiver $126_n$ comprises an optical drop filter $440_n$, an optical receiver $450_n$, and an optical transmitter $460_n$ connected by optical waveguides 402-408 as indicated in FIG. 4A.

Optical drop filter $440_n$ operates to: (i) couple WDM component $312_{n,1}$ of optical signal $312_n$ received through waveguide 402 into waveguide 404; and (ii) couple WDM component $312_{n,2}$ of optical signal $312_n$ into waveguide 406. Waveguides 404 and 406 then operate to apply WDM components $312_{n,1}$ and $312_{n,2}$ to optical receiver $450_n$ and optical transmitter $460_n$, respectively.

Optical receiver $450_n$ operates to; (i) receive WDM component $312_{n,1}$ from optical waveguide 404; (ii) recover the data encoded in WDM component $312_{n,1}$; and (iii) direct the recovered data to port $122_n$ (also see FIG. 1).

Optical transmitter $460_n$ operates to: (i) receive WDM component $314_{n,2}$ from optical waveguide 406; (ii) modulate carrier wavelength $\lambda_{N+n}$ of the received WDM component $312_{n,2}$ with data received by way of port $122_n$; and (iii) apply a resulting modulated optical signal $332_n$ to optical waveguide 408. In the embodiment shown in FIG. 4A, optical transmitter $460_n$ comprises an optical modulator $468_n$ and a driver circuit $464_n$ connected as indicated in FIG. 4A. In various alternative embodiments, other suitable transmitter structures and/or architectures known in the pertinent art may also be used to implement optical transmitter $460_n$.

FIG. 4B shows a block diagram of a first example embodiment of optical drop filter $440_n$. In this embodiment, optical drop filter $440_n$ comprises a 3-dB power splitter 410 and optical filters 412 and 414. Optical filter 412 has spectral characteristics that cause this filter to pass through WDM component $312_{n,2}$ while stopping WDM component $312_{n,1}$. Optical filter 414 has spectral characteristics that cause this filter to pass through WDM component $312_{n,1}$ while stopping WDM component $312_{n,2}$. In some embodiments, one or both of optical filters 412 and 414 may be tunable.

FIG. 4C shows a block diagram of a second example embodiment of optical drop filter $440_n$. In this embodiment, optical drop filter $440_n$ comprises an AWG 420. The pass bands of AWG 420 are such that WDM components $312_{n,1}$ and $312_{n,2}$ are directed from optical waveguide 402 to optical waveguides 404 and 406, respectively.

Figure 4D:
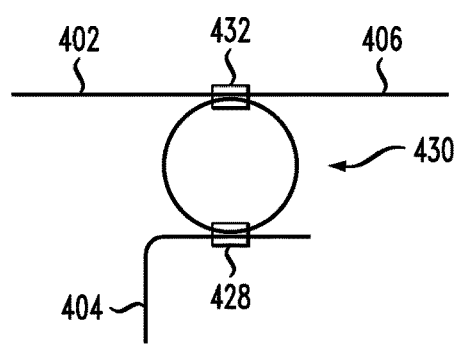

FIG. 4D shows a block diagram of a third example embodiment of optical drop filter $440_n$. In this embodiment, optical drop filter $440_n$ comprises a ring resonator 430 coupled to optical waveguides 402-406 using optical couplers 428 and 432. The resonant frequency of ring resonator 430 is such that the ring resonator causes (i) WDM component $312_{n,1}$ to be dropped from waveguide 402 into waveguide 404 and (ii) WDM component $312_{n,2}$ to be transferred from waveguide 402 into waveguide 406 without significant attenuation. In some embodiments, the resonant frequency of ring resonator 430 may be tunable.

Figure 5:
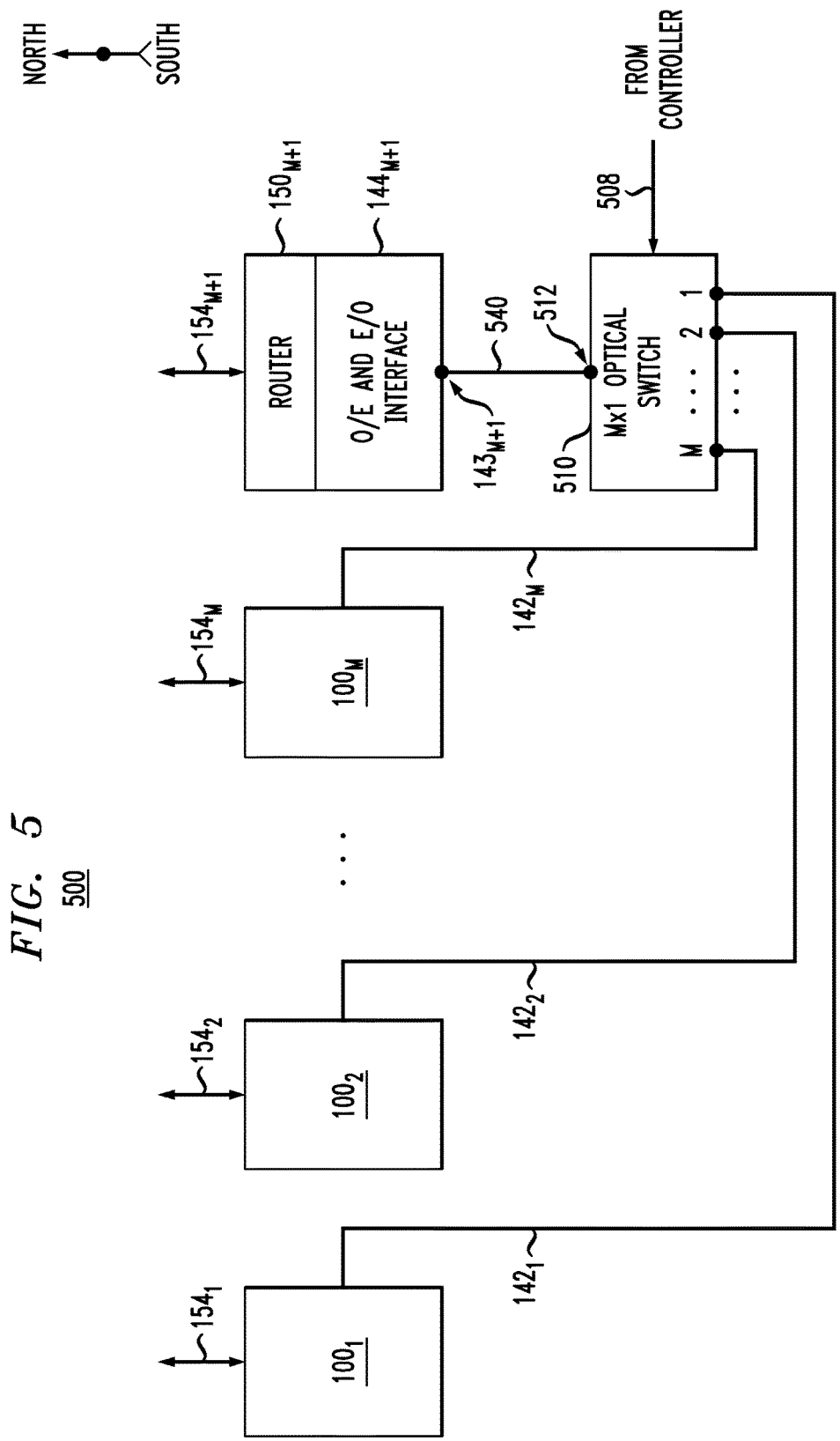
FIG. 5 shows a block diagram of a communication system according to another embodiment.

FIG. 5 shows a block diagram of a communication system 500 according to another embodiment. System 500 comprises M nominal copies of system 100 (FIG. 1), which are labeled $100_1$-$100_M$, respectively. System 500 further comprises an M×1 optical switch 510, an electro-optical interface $144_{M+1}$, and a router $150_{M+1}$. Electro-optical interface $144_{M+1}$ is a nominal copy of electro-optical interface 144 (see FIGS. 1-2). Router $150_{M+1}$ is a nominal copy of router 150 (FIG. 1).

Optical switch 510 has M south ports 1, 2, . . . , M and a north port 512. In operation, optical switch 510 can connect a selected one of its south ports 1, 2, . . . , M to the north port 512 in response to a control signal 508 applied to the switch by a network controller. South ports 1, 2, . . . , M of optical switch 510 are connected to systems $100_1$-$100_M$ using fiber-optic cables $142_1$-$142_M$, respectively (also see FIG. 1). North port 512 of optical switch 510 is connected to south port $143_{M+1}$ of electro-optical interface $144_{M+1}$ using a fiber-optic cable 540.

During normal operation of system $100_m$ (where m=1, 2, . . . , M), the network controller is used to configure the corresponding optical switch 138 to end-connect fiber-optic cables 136 and 140 of that system (see FIG. 1). As a result, in this configuration, the network hosts 110 of system $100_m$ can communicate with external entities by way of the L3 port $154_m$, e.g., as described above in reference to FIGS. 1-4. In addition, system 500 provides the network hosts 110 of any system $100_m$ with a redundant communication path to the external entities by way of the L3 port $154_{M+1}$ of router $150_{M+1}$. This redundant communication path provides fault protection against certain system faults and can be engaged by appropriately configuring optical switch 510 (FIG. 5) and the optical switch 138 (see FIG. 1) of system $100_m$. More specifically, to direct data traffic through the L3 port $154_{M+1}$ of router $150_{M+1}$ instead of the L3 port $154_m$ of system $100_m$, the optical switch 138 of system $100_m$ is configured by the network controller to end-connect fiber-optic cables 136 and $142_m$. The network controller can then apply an appropriate control signal 508 to configure optical switch 510 to connect the south port m and north port 512 thereof, thereby end-connecting fiber-optic cables $142_m$ and 540.

FIG. 6 shows a block diagram of a light source 600 that can be used to supply carrier wavelengths to interfaces 144 (FIG. 2) and/or 134 (FIG. 3) according to an embodiment. Light source 600 comprises (i) CW lasers $610_1$-$610_{2N}$ configured to generate CW optical signals $612_1$-$612_{2N}$ having carrier wavelengths $\lambda_1$-$\lambda_{2N}$, respectively, and (ii) an optional optical amplifier 620. Optical amplifier 620 can be used, e.g., to boost the optical power of optical signals $612_1$-$612_{2N}$ if appropriate or necessary for proper operation of system 100.

The above-described architecture of system 100 advantageously enables the use of a single, conveniently located light source 600 to provide carrier wavelengths for both uplink and downlink optical traffic through that system.

In an example embodiment, optical amplifier 620 comprises an optical wavelength multiplexer (MUX) 630, an Erbium-doped fiber amplifier (EDFA) 640, and an optical wavelength demultiplexer (DMUX) 650.

Optical wavelength multiplexer 630 is configured to: (i) receive CW optical signals $612_1$-$612_{2N}$ from lasers $610_1$-$610_{2N}$; (ii) generate a WDM signal 632 by optically multiplexing CW optical signals $612_1$-$612_{2N}$; and (iii) apply WDM signal 632 to EDFA 640. In an example embodiment, optical wavelength multiplexer 630 can be similar to optical wavelength multiplexer 230 (FIG. 2).

EDFA 640 is configured to optically amplify WDM signal 632, thereby generating an amplified WDM signal 642.

Optical wavelength demultiplexer 650 is configured to demultiplex WDM signal 642 into CW optical signals 652$_1$-652$_{2N}$ having carrier wavelengths $\lambda_1$-$\lambda_{2N}$, respectively. In an example embodiment, optical wavelength demultiplexer 650 can be a nominal copy of optical wavelength multiplexer 630 connected to direct the optical signals transmitted therethrough in the opposite direction.

In an example embodiment, EDFA 640 may have a gain spectrum that causes the optical power of each optical signal 652$_k$ to be greater than the optical power of the corresponding optical signal 612$_k$, where k=1, 2, . . . , 2N. In some embodiments, EDFA 640 may have a gain spectrum that causes greater amplification for optical signals 612$_{N+1}$-612$_{2N}$ than for optical signals 612$_1$-612$_N$.

According to an example embodiment disclosed above, e.g., in the summary section and/or in reference to any one or any combination of some or all of FIGS. 1-6, provided is an apparatus (e.g., 100, FIG. 1, or a part thereof) comprising: a first wavelength demultiplexer (e.g., 310, FIG. 3) having an optical input (e.g., at 232, FIG. 3) and a plurality of optical outputs (e.g., at 312, FIG. 3); a first wavelength multiplexer (e.g., 320, FIG. 3) having an optical output (e.g., at 238, FIG. 3) and a plurality of optical inputs (e.g., at 332, FIG. 3); a plurality of optical drop filters (e.g., 440$_n$, FIGS. 4A-4D), each having a respective optical input (e.g., at 402, FIG. 4A), a respective first optical output (e.g., at 404, FIG. 4A), and a respective second optical output (e.g., at 406, FIG. 4A); and a plurality of first optical modulators (e.g., 468$_n$, FIG. 4A) optically connected between the plurality of optical drop filters and the first wavelength multiplexer; wherein the respective optical input of each of the plurality of optical drop filters is optically connected to a respective one of the plurality of optical outputs of the first wavelength demultiplexer; and wherein the respective second optical output of each of the plurality of optical drop filters is optically connected to a respective one of the plurality of optical inputs of the first wavelength multiplexer by way of a respective one of the plurality of first optical modulators.

In some embodiments of the above apparatus, the apparatus of further comprises a plurality of optical receivers (e.g., 450$_n$, FIG. 4A); and wherein the respective first optical output of each of the plurality of optical drop filters is optically connected to a respective one of the plurality of optical receivers.

In some embodiments of any of the above apparatus, the apparatus further comprises a plurality of network hosts (e.g., 110$_n$, FIG. 1); and wherein each of the plurality of optical receivers is electrically connected (e.g., by way of 122$_n$, FIGS. 1, 4A) to a respective one of the network hosts to direct thereto an output data stream generated in response to a respective modulated optical input signal received from the respective first optical output.

In some embodiments of any of the above apparatus, each of the plurality of first optical modulators is electrically connected (e.g., by way of 122$_n$ and 464$_n$, FIGS. 1, 4A) to a respective one of the network hosts to generate a respective modulated optical output signal in response to a respective input data stream received from said respective one of the network hosts.

In some embodiments of any of the above apparatus, the apparatus further comprises a plurality of network hosts (e.g., 110$_n$, FIG. 1); and wherein each of the plurality of first optical modulators is electrically connected (e.g., by way of 122$_n$ and 464$_n$, FIGS. 1, 4A) to a respective one of the network hosts to generate a respective modulated optical signal in response to a respective input data stream received from said respective one of the network hosts.

In some embodiments of any of the above apparatus, the apparatus further comprises a second wavelength multiplexer (e.g., 230, FIG. 2) having an optical output (e.g., at 232, FIG. 2) and a plurality of optical inputs (e.g., at 220 and 228, FIG. 2); and wherein the optical output of the second wavelength multiplexer is fiber-connected (e.g., using 140 and 136, FIGS. 1, 2, 3) to the optical input of the first wavelength demultiplexer.

In some embodiments of any of the above apparatus, the apparatus further comprises a plurality of second optical modulators (e.g., 218$_n$, FIG. 2) optically connected to apply modulated light to a first subset (e.g., 220, FIG. 2) of the optical inputs of the second wavelength multiplexer.

In some embodiments of any of the above apparatus, a different second subset (e.g., 228, FIG. 2) of the optical inputs of the second wavelength multiplexer is configured to receive continuous-wave light.

In some embodiments of any of the above apparatus, each of the plurality of first optical modulators is configured to generate modulated light by modulating continuous-wave light of a respective different carrier wavelength of a first plurality (e.g., $\lambda_{N+1}$-$\lambda_{2N}$, FIG. 4A) of carrier wavelengths, the continuous-wave light being received from the respective second optical output; and wherein each of the plurality of second optical modulators is configured to generate modulated light by modulating continuous-wave light of a respective different carrier wavelength of a second plurality (e.g., $\lambda_1$-$\lambda_N$, FIG. 2) of carrier wavelengths, the first and second pluralities of carrier wavelengths having no carrier wavelength in common.

In some embodiments of any of the above apparatus, the apparatus further comprises a plurality of lasers (e.g., 610, FIG. 6) configured to generate continuous-wave light at a plurality of different carrier wavelengths (e.g., $\lambda_1$-$\lambda_N$, FIG. 6); and wherein each of the plurality of second optical modulators is configured to generate modulated light by modulating the continuous-wave light of a respective one of the different carrier wavelengths.

In some embodiments of any of the above apparatus, the apparatus further comprises a second wavelength demultiplexer (e.g., 240, FIG. 2) having an optical input (e.g., at 238, FIG. 2) and a plurality of optical outputs (e.g., at 242, FIG. 2); and wherein the optical input of the second wavelength demultiplexer is fiber-connected (e.g., using 140 and 136, FIGS. 1, 2, 3) to the optical output of the first wavelength multiplexer.

In some embodiments of any of the above apparatus, the apparatus further comprises a plurality of optical receivers (e.g., 250$_n$, FIG. 2), each optically connected to receive light from a respective one of the plurality of optical outputs of the second wavelength demultiplexer.

In some embodiments of any of the above apparatus, the first wavelength multiplexer has fewer (e.g., N, FIG. 3) optical inputs than the second wavelength multiplexer (e.g., 2N, FIG. 2).

In some embodiments of any of the above apparatus, the apparatus further comprises: a second wavelength multiplexer (e.g., 230, FIG. 2) having an optical output (e.g., at 232, FIG. 2) and a plurality of optical inputs (e.g., at 220 and 228, FIG. 2); a second wavelength demultiplexer (e.g., 240, FIG. 2) having an optical input (e.g., at 238, FIG. 2) and a plurality of optical outputs (e.g., at 242, FIG. 2); a plurality of second optical modulators (e.g., 218$_n$, FIG. 2) optically connected to apply modulated light to some of the optical inputs (e.g., 220, FIG. 2) of the second wavelength multiplexer; and a plurality of optical receivers (e.g., 250$_n$, FIG. 2), each optically connected to receive light from a respective one of the plurality of optical outputs of the second wavelength demultiplexer; wherein the optical output of the second wavelength multiplexer is fiber-connected (e.g., using 140 and 136, FIGS. 1, 2, 3) to the optical input of the first wavelength demultiplexer; and wherein the optical input of the second wavelength demultiplexer is fiber-connected (e.g., using 140 and 136, FIGS. 1, 2, 3) to the optical output of the first wavelength multiplexer.

In some embodiments of any of the above apparatus, the apparatus further comprises a router (e.g., 150, FIG. 1) having a plurality of ports (e.g., 146/154, FIG. 1); wherein each of the plurality of second optical modulators is electrically connected (e.g., by way of 146$_n$ and 214$_n$, FIGS. 1, 2) to a respective one of the ports to generate modulated light in response to a respective input data stream received from said respective one of the ports; and wherein each of the plurality of optical receivers is electrically connected (e.g., by way of 146$_n$, FIG. 2) to a respective one of the ports to direct thereto an output data stream generated in response to the light received from the respective one of the plurality of optical outputs of the second wavelength demultiplexer.

In some embodiments of any of the above apparatus, the plurality of ports of the router includes at least one port (e.g., 154, FIG. 1) connectable to an external network (e.g., WAN, FIG. 1, or the Internet); and wherein the router is configurable to receive the respective input data stream from the external network through said at least one port.

In some embodiments of any of the above apparatus, the plurality of ports of the router includes at least one port (e.g., 154, FIG. 1) connectable to an external network (e.g., WAN, FIG. 1, or the Internet); and wherein the router is configurable to transmit the output data stream to the external network through said at least one port.

In some embodiments of any of the above apparatus, the router is further configurable to receive the respective input data stream from the external network through said at least one port.

In some embodiments of any of the above apparatus, the apparatus further comprises: a second wavelength multiplexer (e.g., 230, FIG. 2) having an optical output (e.g., at 232, FIG. 2) and a plurality of optical inputs (e.g., at 220 and 228, FIG. 2); a second wavelength demultiplexer (e.g., 240, FIG. 2) having an optical input (e.g., at 238, FIG. 2) and a plurality of optical outputs (e.g., at 242, FIG. 2); a plurality of optical receivers (e.g., 250$_n$, FIG. 2), each optically connected to receive light from a respective one of the plurality of optical outputs of the second wavelength demultiplexer; and wherein the optical output of the second wavelength multiplexer is fiber-connected (e.g., using 140 and 136, FIGS. 1, 2, 3) to the optical input of the first wavelength demultiplexer; wherein the optical input of the second wavelength demultiplexer is fiber-connected (e.g., using 140 and 136, FIGS. 1, 2, 3) to the optical output of the first wavelength multiplexer; and wherein some of the optical inputs (e.g., 228, FIG. 2) of the second wavelength multiplexer have optical taps (e.g., 202, FIG. 2) connected thereto, the optical taps being connected to the plurality of optical receivers to direct thereto tapped light (e.g., 248, FIG. 2) from said some of the optical inputs.

In some embodiments of any of the above apparatus, at least one of the optical receivers is configured to use the tapped light as an optical local oscillator signal (e.g., 248$_n$, FIG. 2) to be optically mixed with the light received from the second wavelength demultiplexer.

In some embodiments of any of the above apparatus, an optical drop filter of the plurality of optical drop filters is tunable.

In some embodiments of any of the above apparatus, an optical drop filter of the plurality of optical drop filters comprises an arrayed waveguide grating (e.g., 420, FIG. 4C).

In some embodiments of any of the above apparatus, an optical drop filter of the plurality of optical drop filters comprises a ring resonator (e.g., 430, FIG. 4D).

According to another example embodiment disclosed above, e.g., in the summary section and/or in reference to any one or any combination of some or all of FIGS. 1-6, provided is another apparatus (e.g., 100, FIG. 1, or a part thereof) comprising: a plurality of digital data servers (e.g., 110, FIG. 1); a first wavelength demultiplexer (e.g., 310, FIG. 3) having optical outputs (e.g., at 312, FIG. 3) to the digital data servers; a first wavelength multiplexer (e.g., 320, FIG. 3) having optical inputs (e.g., at 332, FIG. 3) from the digital data servers; an optical switch including a plurality of optical transceivers (e.g., 126, FIG. 1), a plurality of optical sources (e.g., 610, FIG. 6), a second wavelength multiplexer (e.g., 230, FIG. 2), and a second wavelength demultiplexer (e.g., 240, FIG. 2); wherein an optical output (e.g., at 232, FIG. 2) of the second wavelength multiplexer is fiber-connected to an optical input (e.g., at 232, FIG. 3) of the first wavelength demultiplexer; wherein an optical input (e.g., at 238, FIG. 2) of the second wavelength demultiplexer is fiber-connected to an optical output (e.g., at 238, FIG. 3) of the first wavelength multiplexer; wherein each optical transceiver is configured to transmit to a respective optical input of the first wavelength multiplexer a modulated optical carrier on a corresponding optical transmission wavelength channel and to receive from a respective optical output of the first wavelength demultiplexer a modulated optical carrier on a different optical reception wavelength channel; wherein each optical source is configured to transmit continuous wave light of a respective one of the wavelength reception channels to a respective optical input of the second optical wavelength multiplexer; and wherein each optical transceiver is configured to receive from the first wavelength demultiplexer continuous wave light of a respective one of the optical reception wavelength channels.

In some embodiments of the above another apparatus, each optical transceiver has an optical modulator connected to modulate data onto light of the optical reception wavelength channel received therein in response to the data being received from a respective one of the digital servers.

In some embodiments of any of the above apparatus, each optical transceiver has a respective optical receiver to demodulate data from light of the optical transmission wavelength channel received therein.

In some embodiments of any of the above apparatus, the first wavelength demultiplexer, the first wavelength multiplexer, and the optical transceivers are located in a rack.

While this disclosure includes references to illustrative embodiments, this specification is not intended to be construed in a limiting sense.

For example, in some embodiments, not all of the carrier wavelengths $\lambda_{N+1}$-$\lambda_{2N}$ may need to be transmitted on the downlink as described above. Instead, some of these carrier wavelengths may be generated locally, e.g., at or near the physical location of the corresponding transceivers 126.

Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

The description and drawings merely illustrate the principles of the disclosure. It will thus be appreciated that those of ordinary skill in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

The functions of the various elements shown in the figures, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

What is claimed is:

1. An apparatus comprising:
a first wavelength demultiplexer having an optical input and a plurality of optical outputs;
a first wavelength multiplexer having an optical output and a plurality of optical inputs;
a plurality of optical drop filters, each having a respective optical input, a respective first optical output, and a respective second optical output;
a plurality of first optical modulators optically connected between the plurality of optical drop filters and the first wavelength multiplexer;
a second wavelength multiplexer having an optical output and a plurality of optical inputs; and
a plurality of second optical modulators optically connected to apply modulated light to a first subset of the optical inputs of the second wavelength multiplexer;
wherein the optical output of the second wavelength multiplexer is fiber-connected to the optical input of the first wavelength demultiplexer;
wherein the respective optical input of each of the plurality of optical drop filters is optically connected to a respective one of the plurality of optical outputs of the first wavelength demultiplexer; and
wherein the respective second optical output of each of the plurality of optical drop filters is optically connected to a respective one of the plurality of optical inputs of the first wavelength multiplexer by way of a respective one of the plurality of first optical modulators.

2. The apparatus of claim 1, further comprising a plurality of optical receivers; and
wherein the respective first optical output of each of the plurality of optical drop filters is optically connected to a respective one of the plurality of optical receivers.

3. The apparatus of claim 2, further comprising a plurality of network hosts; and
wherein each of the plurality of optical receivers is electrically connected to a respective one of the network hosts to direct thereto an output data stream generated in response to a respective modulated optical input signal received from the respective first optical output.

4. The apparatus of claim 3, wherein each of the plurality of first optical modulators is electrically connected to a respective one of the network hosts to generate a respective modulated optical output signal in response to a respective input data stream received from said respective one of the network hosts.

5. The apparatus of claim 1, further comprising a plurality of network hosts; and
wherein each of the plurality of first optical modulators is electrically connected to a respective one of the network hosts to generate a respective modulated optical signal in response to a respective input data stream received from said respective one of the network hosts.

6. The apparatus of claim 1, wherein a different second subset of the optical inputs of the second wavelength multiplexer is configured to receive continuous-wave light.

7. The apparatus of claim 1,
wherein each of the plurality of first optical modulators is configured to generate modulated light by modulating continuous-wave light of a respective different carrier wavelength of a first plurality of carrier wavelengths, the continuous-wave light being received from the respective second optical output; and
wherein each of the plurality of second optical modulators is configured to generate modulated light by modulating continuous-wave light of a respective different carrier wavelength of a second plurality of carrier wavelengths, the first and second pluralities of carrier wavelengths having no carrier wavelength in common.

8. The apparatus of claim 1, further comprising a plurality of lasers configured to generate continuous-wave light at a plurality of different carrier wavelengths; and
wherein each of the plurality of second optical modulators is configured to generate modulated light by modulating the continuous-wave light of a respective one of the different carrier wavelengths.

9. The apparatus of claim 1, further comprising a second wavelength demultiplexer having an optical input and a plurality of optical outputs; and
wherein the optical input of the second wavelength demultiplexer is fiber-connected to the optical output of the first wavelength multiplexer.

10. The apparatus of claim 9, further comprising a plurality of optical receivers, each optically connected to receive light from a respective one of the plurality of optical outputs of the second wavelength demultiplexer.

11. The apparatus of claim 1, wherein the first wavelength multiplexer has fewer optical inputs than the second wavelength multiplexer.

12. The apparatus of claim 1, wherein an optical drop filter of the plurality of optical drop filters is tunable.

13. The apparatus of claim 1, wherein an optical drop filter of the plurality of optical drop filters comprises an arrayed waveguide grating.

14. The apparatus of claim 1, wherein an optical drop filter of the plurality of optical drop filters comprises a ring resonator.

15. An apparatus, comprising:
a plurality of digital data servers;
a first wavelength demultiplexer having optical outputs to the digital data servers;
a first wavelength multiplexer having optical inputs from the digital data servers;
an optical switch including a plurality of optical transceivers, a plurality of optical sources, a second wavelength multiplexer, and a second wavelength demultiplexer;
wherein an optical output of the second wavelength multiplexer is fiber-connected to an optical input of the first wavelength demultiplexer;
wherein an optical input of the second wavelength demultiplexer is fiber-connected to an optical output of the first wavelength multiplexer;
wherein each optical transceiver is configured to transmit to a respective optical input of the first wavelength multiplexer a modulated optical carrier on a corresponding optical transmission wavelength channel and to receive from a respective optical output of the first wavelength demultiplexer a modulated optical carrier on a different optical reception wavelength channel;
wherein each optical source is configured to transmit continuous wave light of a respective one of the wavelength reception channels to a respective optical input of the second optical wavelength multiplexer; and
wherein each optical transceiver is configured to receive from the first wavelength demultiplexer continuous wave light of a respective one of the optical reception wavelength channels.

16. The apparatus of claim 15, wherein each optical transceiver has an optical modulator connected to modulate data onto light of the optical reception wavelength channel received therein in response to the data being received from a respective one of the digital servers.

17. The apparatus of claim 16, wherein each optical transceiver has a respective optical receiver to demodulate data from light of the optical transmission wavelength channel received therein.

18. The apparatus of claim 15, wherein the first wavelength demultiplexer, the first wavelength multiplexer, and the optical transceivers are located in a rack.

19. An apparatus comprising:
a first wavelength demultiplexer having an optical input and a plurality of optical outputs;
a first wavelength multiplexer having an optical output and a plurality of optical inputs;
a plurality of optical drop filters, each having a respective optical input, a respective first optical output, and a respective second optical output; and
a plurality of first optical modulators optically connected between the plurality of optical drop filters and the first wavelength multiplexer;
wherein the respective optical input of each of the plurality of optical drop filters is optically connected to a respective one of the plurality of optical outputs of the first wavelength demultiplexer;
wherein the respective second optical output of each of the plurality of optical drop filters is optically connected to a respective one of the plurality of optical inputs of the first wavelength multiplexer by way of a respective one of the plurality of first optical modulators;
wherein the apparatus further comprises:
a second wavelength multiplexer having an optical output and a plurality of optical inputs;
a second wavelength demultiplexer having an optical input and a plurality of optical outputs;
a plurality of second optical modulators optically connected to apply modulated light to some of the optical inputs of the second wavelength multiplexer; and
a plurality of optical receivers, each optically connected to receive light from a respective one of the plurality of optical outputs of the second wavelength demultiplexer;
wherein the optical output of the second wavelength multiplexer is fiber-connected to the optical input of the first wavelength demultiplexer; and
wherein the optical input of the second wavelength demultiplexer is fiber-connected to the optical output of the first wavelength multiplexer.

20. The apparatus of claim 19, further comprising a router having a plurality of ports;
   wherein each of the plurality of second optical modulators is electrically connected to a respective one of the ports to generate modulated light in response to a respective input data stream received from said respective one of the ports; and
   wherein each of the plurality of optical receivers is electrically connected to a respective one of the ports to direct thereto an output data stream generated in response to the light received from the respective one of the plurality of optical outputs of the second wavelength demultiplexer.

21. The apparatus of claim 20,
   wherein the plurality of ports of the router includes at least one port connectable to an external network; and
   wherein the router is configurable to receive the respective input data stream from the external network through said at least one port.

22. The apparatus of claim 20,
   wherein the plurality of ports of the router includes at least one port connectable to an external network; and
   wherein the router is configurable to transmit the output data stream to the external network through said at least one port.

23. The apparatus of claim 22, wherein the router is further configurable to receive the respective input data stream from the external network through said at least one port.

24. An apparatus comprising:
   a first wavelength demultiplexer having an optical input and a plurality of optical outputs;
   a first wavelength multiplexer having an optical output and a plurality of optical inputs;
   a plurality of optical drop filters, each having a respective optical input, a respective first optical output, and a respective second optical output; and
   a plurality of first optical modulators optically connected between the plurality of optical drop filters and the first wavelength multiplexer;
   wherein the respective optical input of each of the plurality of optical drop filters is optically connected to a respective one of the plurality of optical outputs of the first wavelength demultiplexer;
   wherein the respective second optical output of each of the plurality of optical drop filters is optically connected to a respective one of the plurality of optical inputs of the first wavelength multiplexer by way of a respective one of the plurality of first optical modulators;
   wherein the apparatus further comprises:
      a second wavelength multiplexer having an optical output and a plurality of optical inputs;
      a second wavelength demultiplexer having an optical input and a plurality of optical outputs;
      a plurality of optical receivers, each optically connected to receive light from a respective one of the plurality of optical outputs of the second wavelength demultiplexer; and
   wherein the optical output of the second wavelength multiplexer is fiber-connected to the optical input of the first wavelength demultiplexer;
   wherein the optical input of the second wavelength demultiplexer is fiber-connected to the optical output of the first wavelength multiplexer; and
   wherein some of the optical inputs of the second wavelength multiplexer have optical taps connected thereto, the optical taps being connected to the plurality of optical receivers to direct thereto tapped light from said some of the optical inputs.

25. The apparatus of claim 24, wherein at least one of the optical receivers is configured to use the tapped light as an optical local oscillator signal to be optically mixed with the light received from the second wavelength demultiplexer.

* * * * *